(12) United States Patent
Jagtap

(10) Patent No.: US 9,274,843 B2
(45) Date of Patent: Mar. 1, 2016

(54) MULTI-REDUNDANT SWITCHABLE PROCESS POOLING FOR CLOUD IT SERVICES DELIVERY

(75) Inventor: Sameer S. Jagtap, Austin, TX (US)

(73) Assignee: CA, Inc., New York, NY (US)

(*) Notice: Subject to any disclaimer, the term of this patent is extended or adjusted under 35 U.S.C. 154(b) by 572 days.

(21) Appl. No.: 13/618,126

(22) Filed: Sep. 14, 2012

(65) Prior Publication Data
US 2014/0082156 A1    Mar. 20, 2014

(51) Int. Cl.
| | |
|---|---|
| G06F 15/177 | (2006.01) |
| G06F 9/50 | (2006.01) |
| H04L 12/24 | (2006.01) |
| H04L 29/08 | (2006.01) |
| G06F 9/445 | (2006.01) |
| G06F 9/44 | (2006.01) |

(52) U.S. Cl.
CPC .............. *G06F 9/5027* (2013.01); *G06F 8/60* (2013.01); *G06F 8/71* (2013.01); *G06F 2209/5018* (2013.01); *H04L 41/08* (2013.01); *H04L 41/0803* (2013.01); *H04L 67/10* (2013.01); *H04L 67/34* (2013.01)

(58) Field of Classification Search
CPC . G06F 2209/5018; G06F 9/5027; G06F 8/71; G06F 8/60; H04L 41/08; H04L 41/0803; H04L 67/34; H04L 67/10
USPC .............. 718/1, 104; 709/226, 223, 220, 217; 707/692; 717/101, 115, 121
See application file for complete search history.

(56) References Cited

U.S. PATENT DOCUMENTS

| | | | |
|---|---|---|---|
| 8,261,295 B1 | 9/2012 | Risbood et al. | |
| 2010/0131948 A1 | 5/2010 | Ferris | |
| 2011/0265164 A1 | 10/2011 | Lucovsky et al. | |
| 2011/0295998 A1 | 12/2011 | Ferris et al. | |
| 2012/0030672 A1* | 2/2012 | Zygmuntowicz et al. | 718/1 |
| 2012/0203823 A1 | 8/2012 | Manglik et al. | |
| 2013/0060928 A1* | 3/2013 | Shao | 709/223 |
| 2013/0151680 A1* | 6/2013 | Salinas et al. | 709/223 |

(Continued)

FOREIGN PATENT DOCUMENTS

WO    2013166682 A1    5/2012

OTHER PUBLICATIONS

United States Patent and Trademark Office, Office Action for related U.S. Appl. No. 13/618,352, mailed Jul. 7, 2014.

(Continued)

*Primary Examiner* — Jungwon Chang
(74) *Attorney, Agent, or Firm* — Baker Botts L.L.P.

(57) ABSTRACT

A system, apparatus, method, and computer program product for providing multi-redundant switchable process pooling cloud IT service delivery with one or more containers are disclosed. The containers comprise one or more processes that are configured to provide the at least one service; one or more adapters that are configured to connect the one or more processes to one or more appliances, applications, and other services that are required to provide the at least one service; a container specification that identifies the one or more appliances, applications, and other services that are required to provide the at least one service; and one or more configuration scripts that, when executed by the processor, are configured to connect the one or more processes to the one or more appliances, application, and other services identified by the container specification utilizing the one or more adapters.

24 Claims, 4 Drawing Sheets

(56) References Cited

U.S. PATENT DOCUMENTS

| | | |
|---|---|---|
| 2013/0204849 A1* | 8/2013 | Chacko .................. 707/692 |
| 2013/0232463 A1* | 9/2013 | Nagaraja et al. ............ 717/101 |
| 2013/0232470 A1 | 9/2013 | Yung |
| 2013/0232498 A1* | 9/2013 | Mangtani et al. ............ 718/104 |
| 2013/0254755 A1 | 9/2013 | Yousouf et al. |
| 2014/0040883 A1 | 2/2014 | Tompkins |
| 2014/0053150 A1* | 2/2014 | Barnett et al. .................. 718/1 |
| 2014/0059226 A1* | 2/2014 | Messerli et al. ............ 709/226 |

OTHER PUBLICATIONS

United States Patent and Trademark Office, Office Action for related U.S. Appl. No. 13/618,352, mailed Dec. 12, 2014.

United States Patent and Trademark Office, Advisory Action for related U.S. Appl. No. 13/618,352, mailed Feb. 25, 2015.

United States Patent and Trademark Office, Office Action for related U.S. Appl. No. 13/618,352, mailed May 12, 2015.

United States Patent and Trademark Office, Office Action for related U.S. Appl. No. 13/830,351, mailed Jun. 3, 2015.

United States Patent and Trademark Office, Office Action for related U.S. Appl. No. 13/618,352, mailed Sep. 4, 2015.

United States Patent and Trademark Office, Office Action for related U.S. Appl. No. 13/830,351, mailed Oct. 7, 2015.

United States Patent and Trademark Office, Advisory Action for related U.S. Appl. No. 13/973,675, mailed Oct. 21, 2015.

* cited by examiner

MULTI-REDUNDANT SWITCHABLE PROCESS POOLING FOR CLOUD IT SERVICES DELIVERY

BACKGROUND

The present disclosure generally relates to cloud IT services delivery. The disclosed embodiments relate more specifically to a system, apparatus, method, and computer program product for providing multi-redundant switchable process pooling cloud IT service delivery.

The information technology (IT) industry is migrating toward automated solutions that are fairly complex and frequently involve the point-to-point integration of multiple products and services (e.g., provisioning engines, functional products such as security, external cloud services, etc.) to deliver a complete solution, such as a private, hybrid, or public cloud, that addresses a particular market or business need, such as self-service delivery of automated Cloud IT Services. Frequently, and as a rapidly increasing broad, practice in the industry, such point-to-point integrations are accomplished with light-weight run-book automation (RBA) processes and connectors. Such point-to-point integrations are rapidly gaining acceptance in the industry as a whole. The integration of IT services via RBA-type orchestration technologies, however, presents several challenges.

In purpose built solutions for orchestrating and automating cloud IT services across a breadth of capabilities and in all multi-product solutions, the integrity of the products and/or services being delivered is dependent on the integrity of the underlying sets of processes, content, and integrations. Many of those services typically are mission critical and/or chargeable services. And the integrity and supportability of the corresponding processes or process sets must be maintained, managed, and preserved in a production environment without compromising the flexibility of process-based, light-weight integrations and automation so that those processes or process sets can be used in multiple environments.

Each customer environment is unique and has needs for potential variations to processes to match each customer's business needs. For example, the process or number of approvals required for the fulfillment of a service request for a first service provider may be different from that of a second service provider, which may be different than the number of approvals required for an enterprise, even though the basic cloud IT service offered by all three generally is the same. That challenge typically is solved by modifying the corresponding process from the process or process set that is delivering the cloud IT service as required to suit a particular customer environment or need. That approach, however, is tedious, involves manual intervention, and is prone to errors.

Such errors may break the integrity of the process or process set, which may require potential downtime and/or a thorough re-testing of all other processes in the process or process set to ensure the integrity of the cloud IT service or the multi-product solution being delivered. Moreover, the result of modifying the process or process set is to create one-off implementations, which are difficult to keep track of, manage, and sustain (e.g., fault isolation, updates, diagnosis, etc.). And in an industry that has proliferated a large number of cloud IT services and multi-product solutions that each have a large number of different variations of orchestration process driven integrations that make those services and solutions possible, keeping track of, managing, and sustaining those processes or process sets on an ongoing basis is even more challenging.

Among the specific challenges associated RBA-type orchestration technologies is organizing content related to a cloud IT service into a distributable package. In the context of a cloud IT service delivery solution, the content, processes, connectors, etc. distributed in a particular package are essentially related to and representative of a service. Packaged content, while relatively easy to distribute and configure, loses its context once un-packaged. Accordingly, after content is installed, it is indistinguishable from other processes or content that exists in the environment. In other words, the distributed package is assimilated when it is installed and, therefore, is difficult to manage after that.

Another challenge associated with RBA-type orchestration technologies is that packaged content is easily and necessarily modifiable in the field. Because changes to the content represent changes to the service, managing such changes becomes a crucial and challenging requirement for maintaining the context of the cloud IT service. But even when packaged content correctly represents a cloud IT service, it provides no context for the operations, management, or lifecycle of the cloud IT service it represents (e.g., activation/de-activation, entitlements, metering, changes, content updates, etc.). And without the proper context, the integrity of the cloud IT service being delivered, and even the integrity of the entire solution, will depend on the integrity and manageability of the underlying sets of processes and integrations packaged that are packaged for distribution.

In addition, the entitlement context of a cloud IT service must be maintained. Although packaged content may be access controlled, it has no service context of entitlements. Moreover, packaged content cannot address dependencies, field updateability, or changes related to the support of content packages. And a packaged content set does not maintain state, while a cloud IT service must maintain state in the context of a particular solution (e.g., "is this service active/in-active"). It is those features, among others, that make keeping track of, managing, and sustaining processes and process sets so challenging.

BRIEF SUMMARY

The present disclosure is directed to system, apparatus, method, and computer program product for providing multi-redundant switchable process pooling cloud IT service delivery with one or more containers. The containers comprise one or more processes that are configured to provide the at least one service; one or more adapters that are configured to connect the one or more processes to one or more appliances, applications, and other services that are required to provide the at least one service; a container specification that identifies the one or more appliances, applications, and other services that are required to provide the at least one service; and one or more configuration scripts that, when executed by the processor, are configured to connect the one or more processes to the one or more appliances, application, and other services identified by the container specification utilizing the one or more adapters

BRIEF DESCRIPTION OF THE DRAWINGS

Aspects of the present disclosure are illustrated by way of example and are not limited by the accompanying figures with like references indicating like elements.

In those figures, like reference numerals refer to like parts, components, structures, and/or processes.

DETAILED DESCRIPTION

Figure 1:
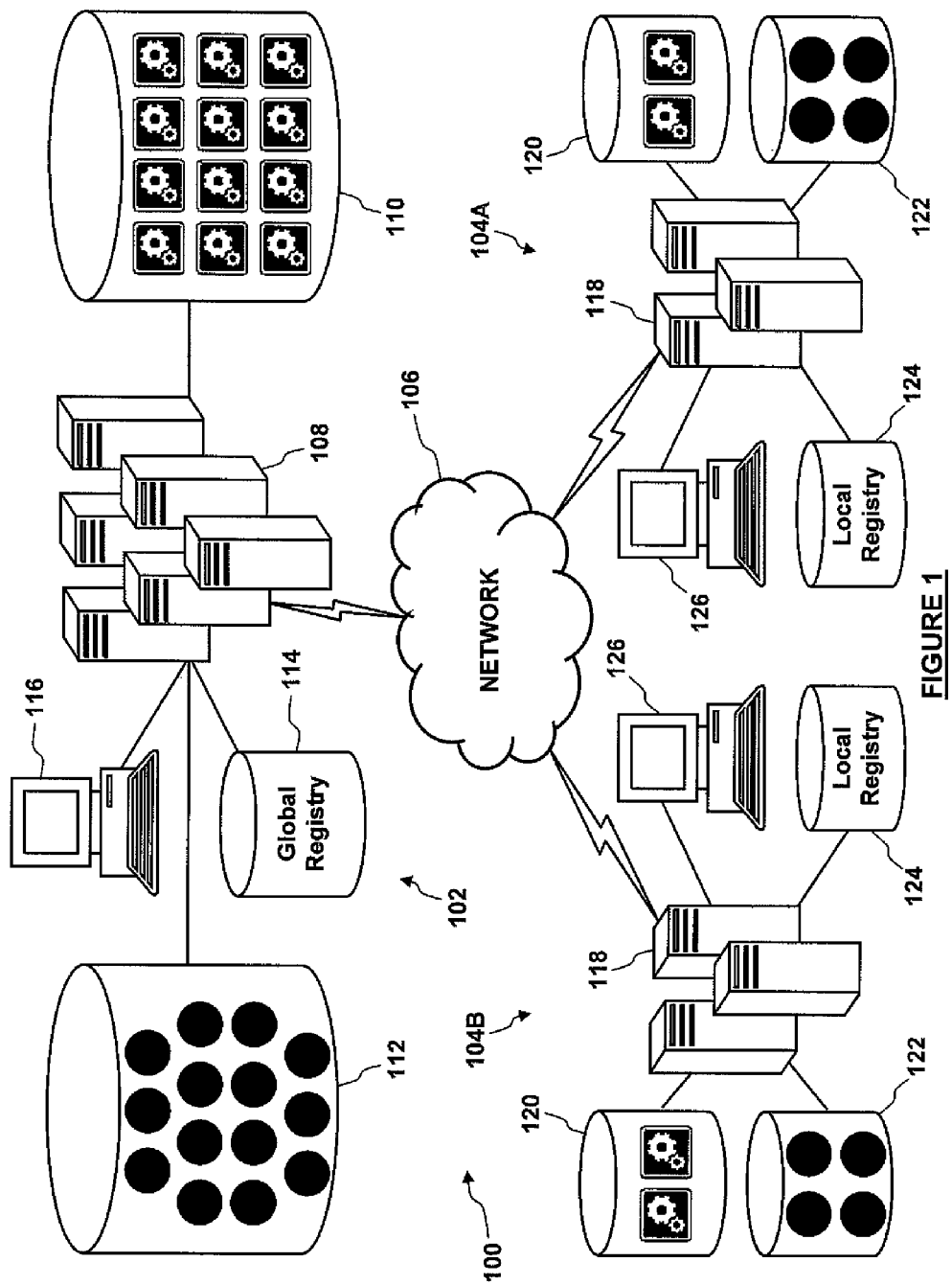
FIG. 1 is a schematic diagram illustrating an example of a communications network according to a non-limiting embodiment of the present disclosure.

As will be appreciated by those of ordinary skill in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, microcode, etc.), or by combining software and hardware implementations that may all generally be referred to herein as a "circuit," "module," "component," or "system." Furthermore, aspects of the present disclosure may take the form of a computer program product embodied in one or more computer-readable media having computer-readable program code embodied thereon.

Any combination of one or more computer-readable media may be utilized. The computer-readable media may be a computer-readable signal medium or a computer-readable storage medium. A computer-readable storage medium may be, for example, but not limited to, an electronic, magnetic, optical, electromagnetic, or semiconductor system, apparatus, or device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable signal medium may be transmitted using any appropriate medium, including but not limited to wireless, wireline, optical fiber cable, radio frequency (RF), or any suitable combination thereof.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like; conventional procedural programming languages, such as the "C" programming language, Visual Basic, Fortran 2003, Perl, COBOL 2002, PHP, ABAP, dynamic programming languages such as Python, Ruby and Groovy; or other programming languages. The program code may be executed entirely on a user's computer, partly on the user's computer, as a stand-alone software package, partly on the user's computer and partly on a remote computer, or entirely on the remote computer or server. The remote computer or server may be connected to the user's computer through any type of network, including a local area network (LAN), a wide area network (WAN), or a cellular network. The connection also may be made to an external computer or server (e.g., through the Internet using an Internet Service Provider) in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. Those computer program instructions may be provided to a processor of a general purpose computer, special purpose computer, or other programmable data processing apparatus to produce a machine, such that the instructions, which are executed via the processor of the computer or other programmable instruction execution apparatus, create a mechanism for implementing the functions/acts specified in the flowchart and/or block diagram block or blocks.

Those computer program instructions may also be stored in a computer-readable medium that, when executed, can direct a computer, other programmable data processing apparatus, or other devices to function in a particular manner, such that the instructions, when stored in the computer-readable medium, produce an article of manufacture that includes instructions which, when executed, cause a computer to implement the function/act specified in the flowchart and/or block diagram block or blocks. The computer program instructions also may be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Turning to the drawings, FIG. 1 illustrates a communications network 100 according to a non-limiting embodiment of the present disclosure. The communications network 100 comprises a solution provider system 102 that is in electronic data communication with two (2) service provider systems 104A and 104B via a network connection 106. It should be understood, however, that the communications network 100 depicted in FIG. 1 is illustrative only and could include any number of solution provider systems 102, any number of service provider systems 104A and 104B, and any number of other systems (e.g., service consumer systems, third party systems, etc.).

The solution provider system 102 is maintained by a vendor that offers IT management software and solutions for different cloud IT service provider needs and comprises a plurality of solution servers 108, a central container database 110, a central payload database 112, a central registry database 114, and a solution administrator graphical user interface (GUI) 116. And each of the service provider systems 104A and 104B is maintained by a different cloud IT service provider and comprises a plurality of service servers 118, a local container database 120, a local payload database 122, a local registry database 124, and a service management GUI 126. It should be understood, however, that the solution provider system 102 and the service provider systems 104A and 104B depicted in FIG. 1 are illustrative only and could include any number of each of those network devices 108-126, as well as any number of other network devices (e.g., routers, load balancers, etc.). Because the first service provider system 104A and the second service provider system 104B comprise the same types of network devices 118-126 and operate in a similar manner, any one of those systems 104A or 104B may be referred to generally herein as "a service provider system 104," "the service provider system 104," or some variation thereof (e.g., "that provider system 104").

Each of the systems 102, 104A, and 104B within the communications network 100 is configured to communicate with each other system via any suitable network connection 106 that supports such communications, such as a WAN connection. Further, the network devices 108-116 in the solution provider system 102 and the network devices 118-126 in each of the service provider systems 104A and 104B are configured to communicate with each other via any suitable wired or wireless connection that supports such communications, such as a LAN connection, a wireless LAN (WLAN) connection, a WAN connection, a cellular network connection (e.g., a Global System for Mobile Communications (GSM) connection, a Code Division Multiple Access (CDMA) connection, a Long Term Evolution (LTE) connection, etc.), or a combination of two or more of those network connections. And any of the network devices 108-126 in any one of those systems 102, 104A, or 104E may communicate with any of the other network devices 108-126 in any of those systems 102, 104A, and 104B via any combination of those network connections.

The solution servers 108 and the service servers 118 each comprise a processor, a memory, and a network interface. The processor may include any number of suitable CPUs that are configured to execute computer program code embodied on the memory and to perform the various functions of those servers 108 and 118 described below. The memory may include one or more types of memory (e.g., ROM, RAM, EEPROM, etc.) as required to store the computer program code executed by the processor and to support the execution of that code. And the network interface may include any number of suitable interfaces (e.g., modems, mobile browsers, wireless Internet browsers, etc.) that are configured to support communications with and between the various network devices 108-126 in the solution provider system 102 and the service provider systems 104A and 104B, as well as with and between the solution provider system 102 and the service provider systems 104A and 104B.

The solution servers 108 are configured to provide a central service that may be connected to by multiple solution instances, such as cloud IT service delivery and management solutions implemented at the service provider systems 104A and 104B. That central, network-accessible service maintains a library of available Cloud IT Service Containers 200 (FIGS. 2 and 3) that may be downloaded via the network connection 106 to the local container database 120 within a service provider system 104A or 104B for instantiation and implementation in a multi-product cloud IT service delivery solution.

The central service also maintains a library of payloads 206 (FIGS. 2 and 3) associated with those Cloud IT Service Containers 200 that may be downloaded via the network connection 106 to the local payload database 122 within a service provider system 104A or 104B for instantiation and implementation in a multi-product cloud IT service solution.

The service servers 118 are configured not only to provide one or more multi-product cloud IT service solution to one or more service consumer systems (not shown), they also are configured to provide a container management and configuration (CMC) service 218 (FIG. 2) to which the cloud IT service provider may connect locally via the service management GUI 126 utilizing standard http/web protocols. Or in the alternative, the CMC service 218 may be provided on the solution servers 108 of the solution provider system 102 and connected to remotely via the service management GUI 126 utilizing standard http/web protocols. In either instance, the CMC service 218 is configured to provide the cloud IT service provider that maintains the provider system 104 with a self-service user interface via which the set of automated functions that are consumed by its customers as services may be implemented, managed, and modified.

Each of the databases 110-114 and 120-124 within the communications network 100 comprises memory that is configured to store data records, files, and other objects for access by a database management system (DBMS). The central container database 110 is configured to store the library of Cloud IT Service Containers 200 maintained by the solution servers 108; the central payload database 112 is configured to store the library of payloads 206 maintained by the solution servers 108; the central registry database 114 is configured to store a global registry of supported Cloud IT Service Containers 200, globally unique identifiers (GUIDs) for registered processes or process sets 212 (FIGS. 2 and 3), and container affiliations that is maintained by the solution servers 108; the local container database 120 is configured to store a local library of the Cloud IT Service Containers 200 downloaded by the service servers 118; the local payload database 120 is configured to store a local library of the payloads 206 downloaded by the service servers 118; and the local registry database 122 is configured to store a local registry of Cloud IT Service Containers 200, GUIDs for registered processes or process sets 212, and container affiliations that have been downloaded by the services servers 118. Accordingly, the solution servers 108 and service servers 118 each may comprise a DBMS to manage those libraries and registries.

Each of the GUIs 116 and 126 within the communications network 100 comprises a processor, a memory, an input device, an output device, and a network interface. The processor, memory, and network interface may be similar to those described above with respect to the solution servers 108 and the service servers 118. And the input device may include any number of suitable devices that are configured to receive input from a user (e.g., a keypad, a microphone, a camera, a retinal scanner, a print pad, an electronic receiver, a touch screen, etc.), while the output device may include any number of suitable devices that are configured to output data to a user in a meaningful manner (e.g., a display, a printer, a speaker, etc.). Accordingly, each of the GUIs 116 and 126 may be any suitable network device with each of those components (e.g., a personal computer, a tablet computer, a personal digital assistant (PDA), a smartphone, etc.).

Figure 2:
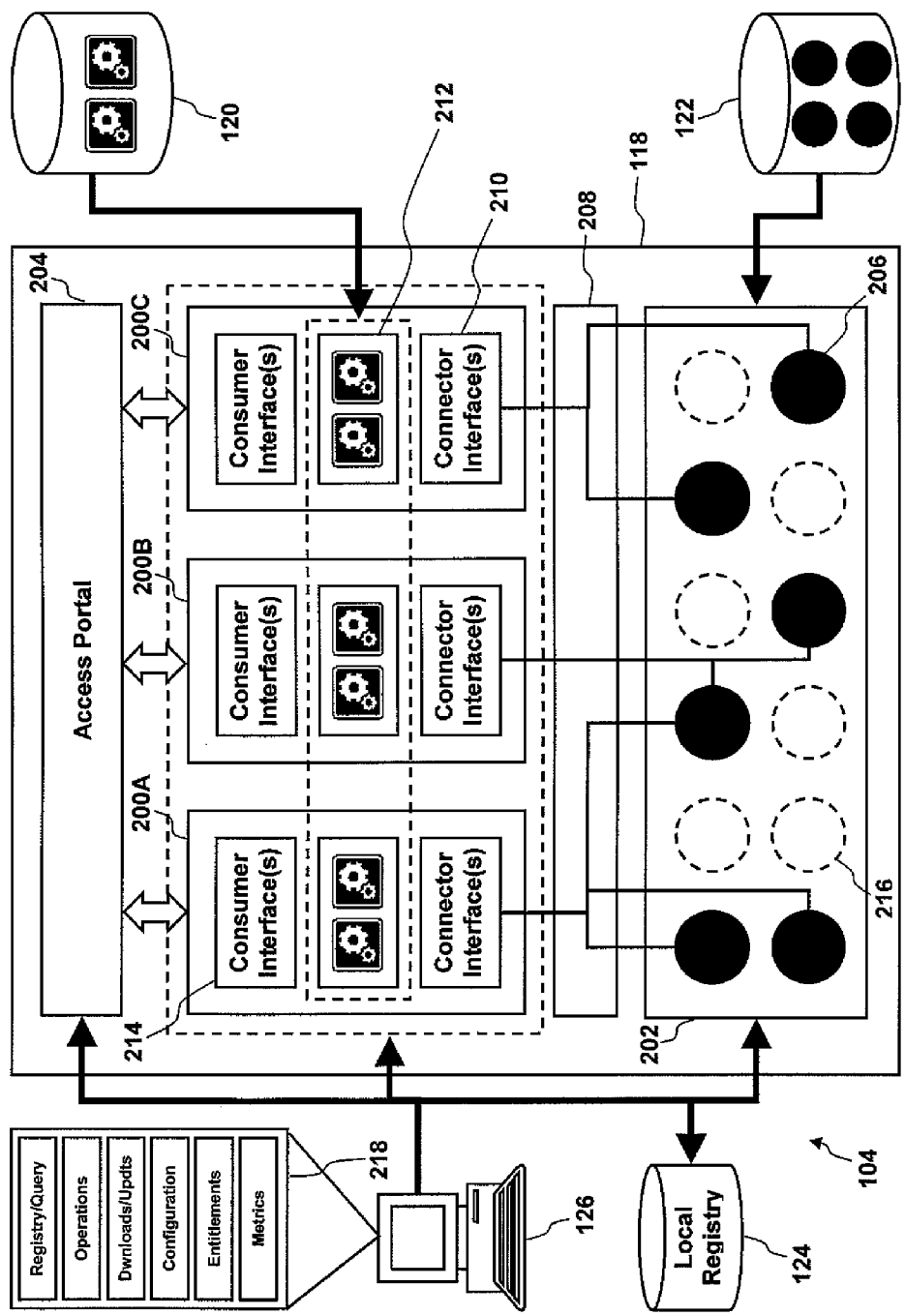
FIG. 2 is a schematic diagram illustrating an example of a service provider system according to a non-limiting embodiment of the present disclosure.

Turning to FIG. 2, the multi-product cloud solution provided by the service servers 118 may be supported by a plurality of Cloud IT Service Containers 200A-200C, a payload pool/grid deployment 202, and an access portal 204. Each of the Cloud IT Service Containers 200A-200C is configured to provide the processes and integrations required to support one or more cloud IT services that are provided to consumers via the service provider system 104. Each of the Cloud IT Service Containers 200A-200C may connect to payloads 206 in the payload pool/grid deployment 202 or to other applications or external services not in the payload pool/grid deployment 202 that are accessible to the Cloud IT Service Container 200A, 200B, or 200C via standard internet protocols. Additionally, each of the Cloud IT Service Containers 200A-200C may connect to payloads 206 or external applications or services via connectors provided in those Cloud IT Service Containers 200A-200C, or connectors may connect indirectly via an intermediary interconnect or service bus 208. Such an intermediary interconnect or service bus 208 may provide a common integration point or bus for all Cloud IT Service Containers 200A-200C to connect to payloads 206 or applications or services via connector interfaces 210 included within the Cloud IT Service Container 200A-200C. Such an intermediary interconnect or service bus 208 may be inserted between Cloud IT Service Containers 200 and payload 206.

The payload pool/grid deployment 202 is configured to provide a dedicated and secure pool, or grid, of payloads 206 in which each of the payloads 206 that has been downloaded to the local payload database 122 may be instantiated for the solution and provisioned for one or more of the Cloud IT Service Containers 200A-200C. And the access portal 204 is configured to establish the different entitlements, accesses, and other privileges that different cloud service consumers, or tenants, are provided for each of services supported by each of the Cloud IT Service Containers 200A-200C.

Each of the Cloud IT Service Containers 200A-200C comprises one or more connector interfaces 210, one or more processes or process sets 212, and one or more consumer interfaces 214. And the payload pool/grid deployment 202 comprises a plurality of grid slots 216 where a payload 206 may be provisioned for one or more Cloud IT Service Containers 200A-200C. In FIG. 2, for example, three (3) payloads 206 have been provisioned for the first Cloud IT Service Container 200A; two (2) payloads 206 have been provisioned for the second Cloud IT Service Container 200B; and two (2) payloads 206 have been provisioned for the third Cloud IT Service Container 200C. Moreover, by virtue of pooling those payloads 206 in the payload pool/grid deployment 202, one (1) of those payloads 206 has been provisioned for both the first Cloud IT Service Container 200A and the second Cloud IT Service Container 200C. Nevertheless, separate instances of a payload 206 also may be provisioned, if required. Because the first Cloud IT Service Container 200A, the second Cloud IT Service Container 200B, and the third Cloud IT Service Container 200C comprise the same types of components 210-214 and operate in a similar manner, any one of those systems 200A, 200B, or 200C may be referred to generally herein as "a Cloud IT Service Container 200," "the Cloud IT Service Container 200," or some variation thereof (e.g., "that Cloud IT Service Container 200").

Via the service management GUI 126, a cloud IT service provider may access a CMC service 218 to implement, manage, and/or modify the downloaded Cloud IT Service Containers 200A-200C and to set the entitlements, accesses, and other privileges for each of the services supported by each of the Cloud IT Service Containers 200A-200C. The services supported by each of the Cloud IT Service Containers 200A-200C represent a solution instance, and the CMC service 218 is configured to operate in the context of that solution instance. Accordingly, each of the service provider systems 104A and 104B in the communications network 100 may have its own CMC service 218 for implementing, managing, and/or modifying the Cloud IT Service Containers 200A-200C in that service provider system 104A and 104B.

A cloud IT service provider may implement a Cloud IT Service Container 200 in the service provider system 104 via the CMC service 218 by downloading the Cloud IT Service Container 200 from the solution provider system 102. That download initiates an autonomic process in which the CMC service 216 automatically implements a Cloud IT Service Container 200 in a multi-product cloud IT service solution by downloading the Cloud IT Service Container 200 to the local container database 120 from the central container database 110; instantiating the Cloud IT Service Container 200 in the context of the solution, reading and decomposing the container specification 300 (FIG. 3); executing container automation scripts that automatically invoke the download to the local payload database 122 of any payload(s) 206 that may be required from the central payload database 112 to implement that Cloud IT Service Container 200; and provisioning the downloaded payload(s) 206 by invoking payload configuration scripts in the container specification 300 to automatically configure, or pair, each Cloud IT Service Container 200 with its corresponding payload(s) 206. In a similar manner, the CMC service 218 also may implement a Cloud IT Service Container 200 that already has been downloaded to the local container database 120 utilizing payloads 206 that already have been downloaded to the local payload database 122.

A cloud IT service provider may manage the downloaded Cloud IT Service Containers 200A-200C in the service provider system 104 via the CMC service 218 by invoking various Standard Operations supported by the Cloud IT Service Containers 200A-200C (e.g., Tables 2 and 3); by collecting, tracking, and recording usage metrics and events associated with the Cloud IT Service Containers 200A-200C and the services supported by those Cloud IT Service Containers 200A-200C; and by generating a journaled log of changes to and the current state of the Cloud IT Service Containers 200A-200C. And a cloud IT service provider may modify one or more of the downloaded Cloud IT Service Containers 200A-200C by updating one or more of the downloaded Cloud IT Service Containers 200A-200C when changes to one or more corresponding Cloud IT Service Containers 200 are made so that the Cloud IT Service Containers 200A-200C in the local container database 120 remain synchronized with those corresponding Cloud IT Service Containers 200. A cloud IT service provider also may modify one or more of the downloaded Cloud IT Service Containers 200A-200C by creating one or more custom operations that may be invoked by one or more of the Cloud IT Service Containers 200A-200C; by modifying one or more existing processes or process sets 212 in one or more of the Cloud IT Service Containers 200A-200C; by creating one or more new processes or process sets 212 in one or more of the Cloud IT Service Containers 200A-200C; by adding one or more processes or process sets 212 to one or more of the Cloud IT Service Containers 200A-200C; and/or by removing one or more processes or process sets 212 from one or more of the Cloud IT Service Containers 200A-200C.

When a cloud IT service provider synchronizes Cloud IT Service Containers 200 in the local container database 120 of the service provider system 104 with Cloud IT Service Containers 200 in the central container database 110 of the solution provider system 102, the Cloud IT Service Containers 200 in the local container database 120 may be updated to reflect changes in a newer version of the same Cloud IT Service Container 200 in the central container database 110 or to reflect changes in a different Cloud IT Service Container 200 in the central container database 110 that has similar payload dependencies. Similarly, the Cloud IT Service Containers 200 in the central container database 110 may be updated to reflect changes to corresponding containers in the local container database 120. Changes to Cloud IT Service Containers 200 in the central container database 110 may, for example, correspond to updates generated by the vendor that offers IT management software via the solutions provider system 102 and that are intended for proliferation to all of the service provider systems 104A and 104B in the communications network 100, while changes to Cloud IT Service Containers 200 in the local container database 110 may, for example, correspond to custom operations or a new processes or process sets 212 generated by the cloud IT service provider that maintains the service provider system 104 and that are intended for use within that service provider system 104. In the latter example, the custom operations and/or new processes or process sets 212 may subsequently be proliferated to all of the service provider systems 104A and 104B in the communications network 100 if they are registered with the solutions provider system 102 via the CMC service 218.

When a cloud IT service provider creates a custom operation or a new process or process set 212, that cloud IT service provider may utilize the CMC service 218 to upload that operation or process or process set 212 to the solution provider system 102 for testing, certification, and support approval. After the custom operation or new process or process set 212 is tested for potential problems, certified for use with a particular Cloud IT Service Container 200, and approved for operation with the CMC service 218, it is added to the global registry, together with its container affiliation, as a registered operation or process or process set 212. Such registered processes or process sets 212 are identified in the global registry with unique GUIDs, which then are provided in the container specification 300 (FIG. 3) of any Cloud IT Service Container 200 that comprises those processes or process sets 212. The Cloud IT Service Containers 200 may be identified in the global registry in a similar manner.

If a GUID is registered in the global registry, then the corresponding process or process set 212 is considered to be a supported, valid process. And if the GUID is not registered in the global registry, then the corresponding process or process set 212 is considered to be an unsupported process. Nevertheless, unsupported processes or process sets 212 still may be invoked by a Cloud IT Service Container 200. The same is true for the Cloud IT Service Container 200 itself. But maintaining such a registry in the central registry database 114 helps ensure that the functional/management applications on which a container instance depends are available and correctly configured, which helps ensure the integrity of the corresponding Cloud IT Service Container 200 and the services supported by that Cloud IT Service Container 200.

Further, a cloud IT service provider may set the entitlements, accesses, and other privileges for each of the services that are supported by each of the Cloud IT Service Containers 200A-200C in the service provider system 104 via the CMC service 218 by writing them to the container specification 300 for the each of the Cloud IT Service Containers 200A-200C. Accordingly, the access portal 204 may be configured to provide consumers, or tenants, of the cloud IT service provider's services with access to those services based on the settings in the container specification 300. And those entitlements, accesses, and other privileges may be set in the context of the particular services that are supported by each of the Cloud IT Service Containers 200A-200C in a particular service provider system 104, which provides the system-by-system service context for the content of those Cloud IT Service Containers 200A-200C. Moreover, any content added to those Cloud IT Service Containers 200A-200C (e.g., new processes or process sets 212) will automatically inherit those entitlements, accesses, and other privileges by virtue of their being written in the container specifications 300 of those Cloud IT Service Containers' 200A-200C.

Figure 3:
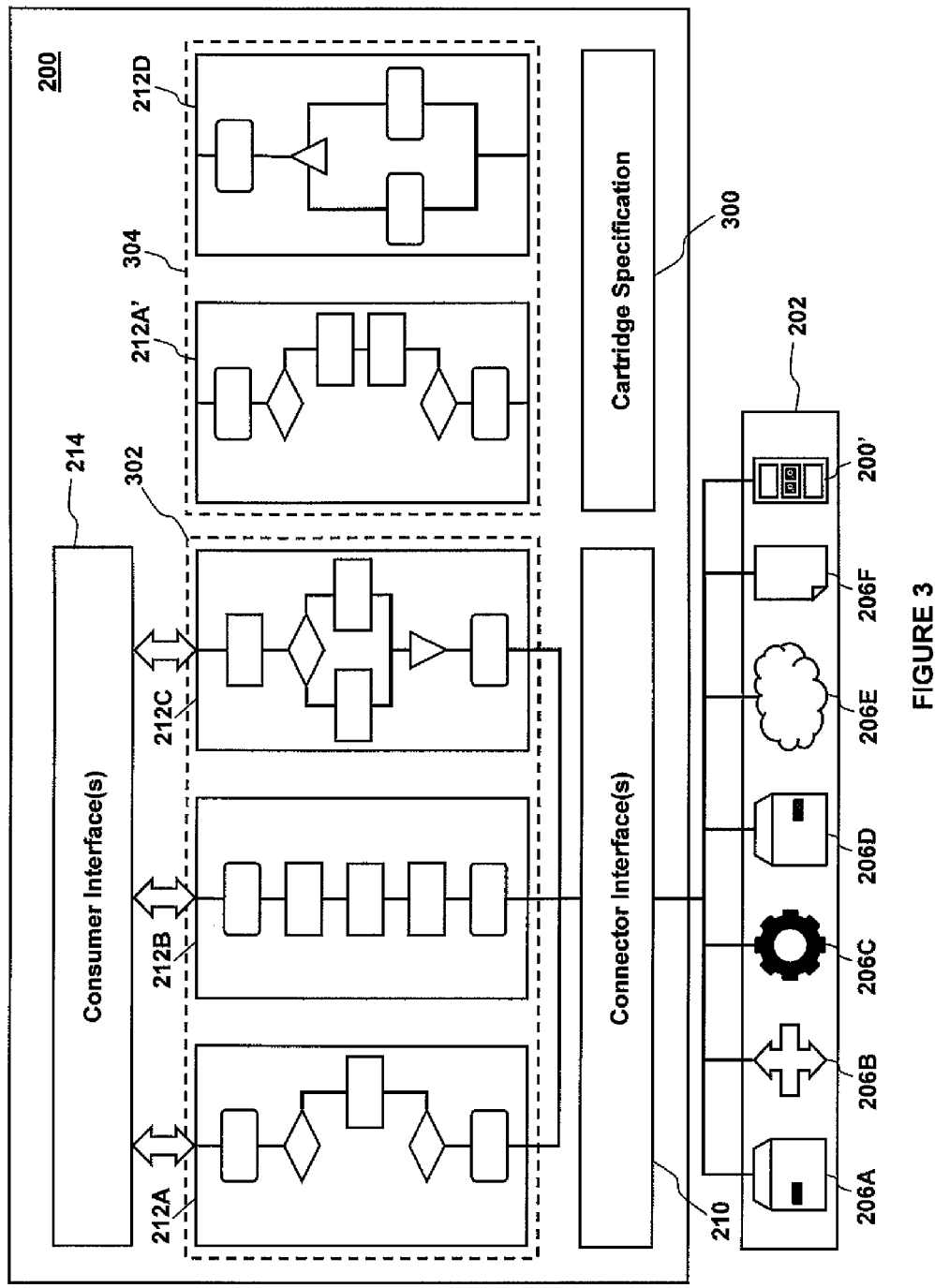
FIG. 3 is a schematic diagram illustrating an example of a cloud service stack according to a non-limiting embodiment of the present disclosure.

The container specification 300 comprises an object schema that provides a representation of the Cloud IT Service Container 200 based on a specified standard, such as the Extensible Markup Language (XML) standard. Such container XML (Ca.xsd) object schema include the general specification of the Cloud IT Service Container 200 as well as references to and descriptions of the automation scripts and payload configuration scripts that are utilized by the CMC service 218 to download, instantiate, and provision the payloads 206 required for successful implementation of the Cloud IT Service Container 200. And in addition to the container specification 300, each Cloud IT Service Container 200 comprises an active pool 302 of processes or process sets 212A and a passive pool 304 of processes or process sets 212, as illustrated in FIG. 3. Accordingly, the Ca.xsd object schema also include the GUIDs that are utilized by the CMC service 218 to track which processes or process sets 212 are in the active pool 302 and which processes or process sets 212 are in the passive pool 304. Just as each Cloud IT Service Container 200 has a unique Ca.xsd object schema, each instance of a Cloud IT Service Container 200 in a solution context correspondingly has a unique Ca.xsd instance.

A cloud IT service provider may modify the Ca.xsd descriptor with a Container Editor Tool provided as part of the CMC service 218. Examples of the notations, tags, or attributes that may be provided in the container specification 300 and edited with the Container Editor Tool are listed below in Table 1.

TABLE 1

Container Schema Descriptors

| Descriptor Tag | Description/Function |
| --- | --- |
| Container GUID | Unique identifier for container |
| Name | Name of container |
| Date | Date container was certified/released |
| Version | Version Information |
| Patch Level | Current patch level |
| Container Type | Type of service represented by container |
| Supported Solution Name(s) | Description of cloud IT service solution supported by container |
| Cloud Service Description | Description of cloud IT service supported by container |
| Functionality Description | Detailed description of service provided/enabled with container |

TABLE 1-continued

Container Schema Descriptors

| Descriptor Tag | Description/Function |
| --- | --- |
| Standard Operations | Operations that must be provided by a container |
| Custom Operations | Operations that may optionally be created for a container |
| Operations Enabled | List of operations supported by container |
| Payload Dependency List | List of Appliance/Application/Service dependencies for preconfigured payloads |
| Service Type Template | Standardized service template based on type of cloud IT service |
| Process GUID | Unique identifier for processes or process sets |
| Current Active Pool GUIDs | List of all active processes or process sets currently utilized in container |
| Current Passive Pool GUIDs | List of all non-active processes or process sets included in container |
| Registered Active Pool GUIDs | List of registered, active processes or process sets included in container |
| Registered Passive Pool GUIDs | List or registered, non-active process included in container |
| Container Dependency List | List of container compatibility with/dependency on other containers |
| Dirty Bit/Support Bit | Maintained bit for determining support |
| State Information | Current state of container (e.g., Downloaded, Installed, Modified, Active, Inactive, Updated, Unsupported, etc.) |
| Change/History Log | Log of changes wit date/time stamp for modifications |
| Connector/Interface List | List of connector, adapter, and interface details, including version |
| Documentation | Documentation for container (URL or self-contained) |
| Locale | Language Supported |
| Contact Information | Creator/support contact information |

In Table 1, the Dirty Bit/Support Bit is a resettable "support bit" or "dirty bit" that is utilized to maintain the integrity of the Cloud IT Service Container 200. Modifications made according to rules or allowed policies do not effect the Dirty Bit/Support Bit, while modifications that may compromise the supportability of the container contents may trigger the Dirty Bit/Support Bit. Thus, the Dirty Bit/Support Bit may be reset to a default value on new installation, and any subsequent modifications to the Cloud IT Service Container 200 may trigger the dirty bit to a non-default value that denotes the type of integrity breech that the Cloud IT Service Container 200 has sustained.

The Service Type Template referenced in Table 1 defines the declarative model, format, and operations of the user interface of the CMC service 218 for a particular type or category of cloud IT service supported by the subject Cloud IT Service Container 200. The model, format, and operations defined by each Service Type Template are standardized for each type or category of cloud IT service so that the user-facing interactions conducted with the CMC service 218 appear the same to a user regardless of the payloads 206 and/or other products, process workflows, services, appliances, applications, and/or devices on which a Cloud IT Service Container 200 may depend to provide that type of cloud IT service. For example, a Cloud IT Service Container 200 may be configured to provide a security service, but different implementations or instances of that Cloud IT Service Container 200 may implement the service template model with different processes or process sets 212 that depend on different target resources based on the same declarative model and template for the security service. Despite those different instances of the Cloud IT Service Container 200 utilizing different target resources or workflows (e.g., a downloaded payload 206 and an external application) to provide that security service, the user interface and operations provided by the user interface of the CMC service 218 will remain the same so as to maintain the consistency of user-facing interactions at the CMC service 218.

The Service Type Template model may captured as an XML file that is provided within the subject Cloud IT Service Container 200. In the alternative, the Service Type Template may be implemented as a link to an external XML template file that is managed by the CMC service 218. In the latter configuration, the CMC service 218 operates as a link, or interface, between the Standard Service Type template and one or more cloud IT services that implement that Standard Service Type template so that the user-facing interactions at the CMC service 218 remain consistent. Moreover, different Cloud IT Service Containers 200 that support different services also may specify the same Standard Service Type template to further maintain the consistency of user-facing interactions at the CMC service 218.

Also in Table 1, the Standard Operations and Custom Operations are captured as automation processes provided within the subject Cloud IT Service Container 200. All Cloud IT Service Containers 200 support a set of Standard Operations that are required for compliance with a container standard that is maintained and owned by the vendor that maintains the solution provider system 102. That container standard defines the rules and allowed policies that determine the state of the Dirty Bit/Support Bit (e.g., ON=supported and OFF=unsupported) based on whether a modification effects the integrity of the Cloud IT Service Container 200. Such Standard Operations may be sub-divided into mandatory and optional operations.

Mandatory operations must be implemented for a Cloud IT Service Container 200 to comply with the container standard, while optional operations may be optionally implemented or not implemented without preventing the Cloud IT Service Container 200 from complying with the container standard when they are not implemented. Nevertheless, the presence of such optional operations in a Cloud IT Service Container 200 may be required for it to comply with the container standard. Some examples of mandatory operations are listed below in Table 2. And some examples of optional operations are listed below in Table 3.

TABLE 2

Mandatory Container Operations

| Command | Operation |
|---|---|
| List_Operations | Lists all operations supported by a container, including standard and custom operations |
| Activate/De-Activate | Activates or de-activates a processes or process sets in context of a live environment |
| Reset | Resets to "factory" default settings |
| Status | Queries and returns current status of container/service, processes, and content |
| List_Content | Produces list of all content details contained within a container |
| List_Service_Descriptions | Lists all services provided/supported by container |
| Query_Data | Enables query of descriptor data |
| Add/Remove_Object | Adds or removes processes or process sets, connectors, scripts, PowerPacks, custom container operations, etc. |
| Configure_Container | Enables the configuration of the container, connector, or other content for container to become operational |
| Get_Metered_Data | Gets data associated with metering of service |
| Set_Entitlement | Adds or removes entitlement for customer or tenant to container |
| Set/Unset | Enables container to be put in/taken out of maintenance mode |
| Get_Version | Gets container version |
| Add/Remove_Operation | Adds or removes container operations |

TABLE 3

Optional Container Operations

| Command | Operation |
|---|---|
| Test_Consumer | Tests the service(s) offered by a container from a customer or tenant perspective |
| Test_Admin | Tests the service(s) offered by a container from an administrator perspective |
| Sync | Enables content from passive pool of one container to be synchronized with the that of another container |
| Download_Payload | Runs automation scripts to automatically download payload(s) required for a container |
| Configure_Paylaod | Runs configuration scripts to automatically configure, or pair, a container with its payload(s) |
| Activate_Payload | Activates payload(s) in context of a live environment |
| Add/Remove_Entity | Adds or removes service provider and/or tenant |
| Get_Cost_Estimate | Gets service costing information or cost of service resource(s) from multiple resource providers or payloads |
| Set_Overload_Tenant | Sets a process GUID in a Cloud IT Service Container to overload another process GUID in the same Cloud IT Service Container |
| Set/Get_QoS | Sets or determines QoS level specifications for Cloud IT Service Container (QoS levels may be arbitrary or as defined in CMC service) |
| Get/Set_QoS_Route | Sets user sessions route for runtime redirection for any user requested resource or user activity or action performed by one or more processes within a Cloud IT Service Container based on QoS levels specified for that Cloud IT Service Container and a user's user ID, group ID, tenant ID, and/or target resource specification or tags |
| Get/Set_Transactional_Cost | Sets and determines transactional costs for each workflow or process or process set within a cloud IT service, or for the whole Cloud IT Service Container |
| Get/Set_Completion_Status | Sets and determines the state or completion status of a user's activity associated with a process or process set within a Cloud IT Service Container |

In Table 3, the Sync operation causes the contents of a first instance of a Cloud IT Service Container 200 to be updated and/or synchronized with that of a second instance of that Cloud IT Service Container 200, such that the same content may be maintained in different instances of the same Cloud IT Service Container 200 or in different container instances with similar dependencies. Rather than requiring content to be downloaded from the first instance of the Cloud IT Service Container 200, moved and/or modified, and then uploaded into the second instance of the Cloud IT Service Container 200, the Sync operation combines those discreet operations into a single, autonomic operation. The Sync operation also facilitates the supportability of the content because it allows a cloud IT service provider to move and/or modify the state of content from a local instance of a Cloud IT Service Container 200 to a remote instance of the Cloud IT Service Container 200 for testing, certification, and approval. Moreover, it allows a cloud IT service provider to upload registered content from a remote instance of a Cloud IT Service Container 200 to a local instance of the Cloud IT Service Container 200 for inspection and modification. The Sync operation also the contents of two local instances of Cloud IT Service Containers 200 to be synchronized. Any sync operation that may result in conflicts between the contents of different instances of Cloud IT Service Container 200 may be referred to an administrator at the solution provider system 102 for resolution.

The Set_Overload_Tenant operation referenced in Table 3 causes a process GUID in a Cloud IT Service Container 200 to overload another process GUID in the same Cloud IT Service Container 200 based on a tenant ID to which a particular user belongs. In other words, the user entitlements for a first process or process set 212 identified with a first process GUID will be set, or overloaded, by a second process or process set 212 with a second process GUID to prevent users with a particular tenant ID from invoking the first process or process set 212 while, at the same time, allowing the users with that tenant ID to invoke the second process or process set 212. Such processes or process sets 212 may be mutually exclusive processes or process sets 212, but they may be presented to the different users as the same process or process set 212 via the user interface of the CMC service 218 to maintain the consistency of user-facing interactions at the CMC service 218, such as when the Cloud IT Service Container 200 is deployed in a multi-tenant cloud solution.

For example, a first tenant in a multi-tenant deployment may require a default process or process set 212A with one level of approval, and a second tenant in that multi-tenant deployment may require an alternative process or process set 212A' with two levels of approval. But both of those processes or process sets 212A and 212A' may be presented to those tenants' users as the same approval process via the user interface of the CMC service 218 (e.g., an approval process). Thus, the alternative process or process set 212A' may overload the default process or process set 212 with a Set_Overload_Tenant operation so that, when a user with a tenant ID corresponding to the second tenant requests that approval process, that user's request is directed from the default process or process set (i.e., the overloaded process set) 212A to the alternative process set 212A (i.e., the overloading process set). The redirection of that request is performed in the background so that it transparent to the user. By contrast, when a user with a tenant ID corresponding to the first tenant requests that approval process, that user's request goes directly to the default process or process set 212A.

Although the foregoing example includes a default process or process set 212A and an alternative process set 212A', a Set_Overload_Tenant operation also may be performed between different instances of the same process set 212. Moreover, a Set_Overload_Tenant operation may be performed on process sets 212 in both the active pool 302 and the passive pool 304. For example, one instance of a process set 212 may be provided in the active pool 302 and a redundant instance of that same process set 212 may be provided in the passive pool 304. The instance of that process or process set 212 in the passive pool may perform the Set_Overload_Tenant operation to overload the instance of that process or process set 212 in the active pool 302 such that, when a user with a tenant ID that matches the tenant ID specified in the Set_Overload_Tenant operation requests the subject process or process set 212, that user's request is directed to the instance of the process or process set 212 in the passive pool 304, which then is automatically moved to the active pool 302 so that it may be invoked. A similar process may be performed when both instances of the same process or process set 212 are provided in the active pool 302, except that both the processes or process sets 212 may be invoked without changing their statuses to active because both already are in the active pool 302.

The Set/Get_QoS operation referenced in Table 3 enables authorized users (e.g., the vendor or an administrator at the cloud provider) to specify one or more QoS levels or constraints for a particular Cloud IT Service Container 200. A single QoS level may be specified for a particular Cloud IT Service Container 200 (e.g., Priority 5) so that all of the users that access the services supported by that Cloud IT Service Container 200 are subject to the same performance constraints (e.g., throughput, packet loss, latency, jitter, etc.). Or a plurality of QoS Levels (e.g., bronze, silver, gold, etc.) may be specified for a particular Cloud IT Service Container 200 so that different users may be subject to different performance constraints based on different criteria, such as user ID, group ID, tenant ID, or the targeted resource (e.g., a downloaded payload 206 versus an external application). In the former instance, the CMC service 218 determines if a QoS level constraint is satisfied for a user before a user is able to access the services supported by the Cloud IT Service Container 200. And in the latter instance, the CMC service 218 allows the user to access the services supported by the Cloud IT Service Container 200, but then governs the user's session routing and resource requests based on one or more of the foregoing criteria. Those accesses may be controlled via access portal 204.

The Set_QoS_Route operation referenced in Table 3 enables authorized users to specify the route selected for each QoS level such that user requests are redirected at run time via that specified route. The Set_QoS_Route operation may be a separate process or process set 212 from those for which it directs user requests. The Set_QoS_Route operation also may be an element of a process or process set 212 for which it directs user requests. Accordingly, via the Set/Get_QoS operation and the Set_QoS_Route operation, the run time behavior of the services supported by a particular Cloud IT Service Container 200 may be shaped by run time data and the one or more QoS levels specified for that Cloud IT Service Container 200.

The Get/Set_Transactional_Cost operation referenced in Table 3 enables authorized users to assign a cost model to a particular Cloud IT Service Container 200, to each consumable process or process set 212 within that Cloud IT Service Container 200, to each consumable element of those processes or process sets 212, and/or to each payload 206 or other resource targeted by those processes or process sets 212. Those cost models are maintained by the CMC service 218 and may either be transactional-based costing models (e.g., charged per transaction), subscription-based costing models (e.g., charged flat fee), or a combination thereof (e.g., some services charged per transaction and others covered under a flat fee). The assignment of cost models to Cloud IT Service Containers 200 and/or the elements within a Cloud IT Service Container 200 enable transactional tracking and cost reporting calculations to be performed at run time in a utility model for each cloud IT service that is managed via the CMC service 218. And the resulting usage information may be logged in the a central registry database 114 of the solution provider system 102.

Also in Table 3, the Get/Set_Completion_Status operation enables the CMC service 218 or an external application to set or determine the state, or completion status, of a particular process or process set 212, task, or activity associated with or initiated by a user or by another process or process set 212 within the context of a particular Cloud IT Service Container 200. The status of completion may be maintained as a percent of task completion and may be set/determined from outside the context of the Cloud IT Service Container 200. The status of completion also may be set/determined from within the Cloud IT Service Container 200, such as by an element of the process or process set 212 that is being tracked or by another process or process set 212. Moreover, each Cloud IT Service Container 200 may define any number of different states for each process or process set 212, task, or activity to facilitate different types of status tracking.

By contrast to mandatory and optional Standard Operations, Custom Operations are new operations that may be defined by an authorized user (e.g., the vendor or an administrator at the cloud provider) utilizing the Container Editor Tool. Such custom operations may be specific to a particular cloud IT service being provided with a Cloud IT Service Container 200. For example, a custom operation may be to fetch a report from an underlying product database associated with a cloud IT service and to email that report to the authorized user, or some other user, every time that operation is invoked. When such a custom operation is defined, the Container Editor Tool adds an entry to the container specification 300 (e.g., Get_Report) that contains the information for invoking, the automated workflow associated with the custom operation. As a result, the custom operation will appear among the operations supported by the Cloud IT Service Container 200 (e.g., List_Operations).

Each of the foregoing operations is maintained as part of the Ca.xsd object schema in the container specification 300. Those operations are separate from the processes or process sets 212 that may be implemented in the Cloud IT Service Container 200 so that they are not directly inline with, or tied to, the cloud IT services supported by that Cloud IT Service Container 200. container payloads 206 also are specified in the Ca.xsd object schema. Because the cloud IT services delivered via the Cloud IT Service Containers 200 involve the automation of processes or process sets 212 that typically depend on one or more external product, service, appliance, application, and/or device for successful configuration and implementation, payloads 206 are specified within the container specification 300 to ensure that those dependencies are satisfied when a Cloud IT Service Container 200 is downloaded from the solution provider system 102.

The products, services, appliances, applications, and/or devices on which a Cloud IT Service Container 200 may depend may reside in physical or virtual environments. Accordingly, payloads 206 may comprise virtual appliances 206A that represent a fully configured functional module or application (e.g., an n-tier application comprising multiple virtual appliances) upon which a Cloud IT Service Container 200 depends to deliver its services. Such virtual appliances 206A are not the business applications or services being delivered within a cloud, but rather are management modules that provide value-added services for such management applications, business applications, and services.

The target products, services, appliances, applications, and/or devices on which a Cloud IT Service Container 200 may depend also may reside in external services that are exposed, for example, via application program interfaces (APIs) (e.g., IT management as cloud IT services that are delivered from IT management applications, such as monitoring services, security services, data backup services, elastic computing cloud ($EC^2$) services, simple storage services ($S^3$), etc.). Accordingly, payloads 206 also may comprise APIs 206B, applications 206C, virtual or physical appliances 206D hosting applications 206C, and/or external cloud IT services 206E upon which a Cloud IT Service Container 200 may depend to deliver its services. Further, payloads 206 may comprise automation scripts 206F that may be invoked to reconfigure content for use in the context of a particular Cloud IT Service Container 200, or they may even depend on or call services exposed by other Cloud IT Service Containers 200'. And the container specification 300 not only specifies which of those payloads 206 are required to successfully configure and implement a particular Cloud IT Service Container 200, it also specifies the automation scripts and configuration scripts required to download and configure each particular payload 206 for operation with the corresponding Cloud IT Service Container 200.

Returning to Table 1, the Current Active Pool GUIDs identify all of the processes or process sets 212 currently in the active pool 302 of the Cloud IT Service Container 200, and the Current Passive Pool GUIDs identify all of the processes or process sets 212 currently in the passive pool 304 of the Cloud IT Service Container 200. The Registered Active Pool GUIDs and Registered Passive Pool GUIDs limit the processes or process sets 212 identified with the Current Active Pool GUIDs and Current Passive Pool GUIDs, respectively, to those processes or process sets 212 that are registered in the global registry maintained in the central registry database 114. In other words the Registered Active Pool GUIDs and Registered Passive Pool GUIDs only identify processes or process sets 212 that are approved to operate with the CMC service 218, while the Current Active Pool GUIDs and Current Passive Pool GUIDs identify all processes or process sets 212, regardless of whether or not those processes or process sets 212 have been registered.

The processes or process sets 212 that are tracked with those GUIDs are separated into an active pool 302 and a passive pool 304 so that new processes or process sets 212 and/or content may be uploaded to a Cloud IT Service Container 200 in a live environment without effecting the active processes or process sets 212 and/or content. The active pool 302 comprises the processes or process sets 212 that are in an "active" state, such that they are available for external consumption by the consumers of the cloud IT service being delivered with that Cloud IT Service Container 200. And the passive pool 304 comprises the processes or process sets 212 that are in an "inactive" state, such that they are not available for consumption but are available to be added to the active pool 302 or switched with processes or process sets in the active pool 302 by changing their state from "inactive" to "active." Because they are not in an "active" state, the processes or process sets 212 in the passive pool 304 may be operated on outside the context of a live deployment, while the Cloud IT Service Container 200 is in the live environment, which allows for modifications, testing, expansion, and updates to processes or process sets 212 to be performed while maintaining the integrity of the Cloud IT Service Container 200 in the live environment.

Each process or process set 212 in the active pool may have any number of redundant, alternative, or additional processes or process sets 212 that may not be used in a particular deployment context. Those redundant, alternative, or additional processes or process sets 212 are provided in the passive pool 304. As depicted in FIG. 3, for example, there are three (3) default processes or process sets 212A-212C in the active pool 302, and one (1) alternative process or process set 212A' and one (1) additional process or process set 212D in the passive pool 304. Although the three (3) default processes or process sets 212A-212C in the active pool 302 represent the cloud IT service or integration currently being supported by the Cloud IT Service Container 200, one or both of the processes or process sets 212K and 212D in the passive pool 304 may be switched with one or more of the processes or process sets 212A-212C in the active pool 302. In the alternative, one or both of the processes or process sets 212A' and 212D in the passive pool 304 may be added to the active pool 302 without removing any of the default processes or process sets 212A-212C from the active pool 302 by changing their state to "inactive."

By way of more specific example, the default first process or process set 212A may support a service that requires one level of approval from a manager, and the alternative first process or process set 212A' may support the same service but require two levels of approval from a manager. And a first cloud IT service provider may need to provide its tenants with a service that requires one level of approval, while a second cloud IT service provider may need to provide its tenants with a service that requires two levels of approval. Accordingly, both the default first process or process set 212A and the alternative first process or process set 212A' are packaged in the Cloud IT Service Container 200 so that different cloud IT service providers may implement different levels of service with the same Cloud IT Service Container 200. Moreover, the additional process or process set 212D is packaged in the Cloud IT Service Container 200 so that cloud IT service providers also may add to the existing services provided to their tenants, rather than or in addition to providing an alternative form of an existing service.

During onsite deployment of the Cloud IT Service Container 200, the Cloud IT Service Container 200 is implemented with the default processes or process sets 212A-212C in the active pool 302. And if a cloud IT service provider's tenants require two levels of approval, the default first process or process set 212A may be switched out for the alternative first process or process set 212A', such that the default first process or process set 212A is moved to the passive pool 304 (i.e., the status of the default first process or process set 212A is changed to "inactive") and the alternative first process or process set 212A' is moved to the active pool 302 (i.e., the status of the alternative first process or process set 212A' is changed to "active"). Similarly, the additional process or process set 212D may be switched or added to the active pool 302 (i.e., the status of the additional process or process set 212D may be changed to "active") to provide an additional, different service to the cloud IT service provider's tenants. Such switching and/or adding of processes or process sets 212 may be accomplished in the field without modifying the content of the Cloud IT Service Container 200.

Providing an active pool 302 and a passive pool 304 in each Cloud IT Service Container 200 not only allows flexibility in the onsite configuration of the Cloud IT Service Container 200 by enabling cloud IT service providers to switch or add processes or process sets 212 as required to suit different tenants without modifying the content of the Cloud IT Service Container 200, it also allows new processes or process sets 212 to be uploaded to the Cloud IT Service Container 200 to expand the services provided by the cloud IT service providers while the Cloud IT Service Container 200 is being utilized in a live environment. For example, an authorized user (e.g., the vendor or an administrator at the cloud IT service provider) may invoke the Add/Remove_Object command to load a new process or process set 212 to the passive pool 304 and then invoke the Activate/De-Activate command to activate the process or process set 212 by changing its state to "active," such that it is moved to the active pool 302. Such processes or process sets 212 automatically inherit the entitlements from the Cloud IT Service Container 200 in which they are activated.

In addition to new and/or alternative processes or process sets 212, the passive pool 304 also may comprise one or more redundant processes or process sets 212 that provide substantially the same functionality as one or more corresponding processes or process sets 212 in the active pool 302. Accordingly, those redundant processes or process sets 212 may be modified, tested, expanded, and/or updated in a live environment while their corresponding processes or process sets 212 remain functioning in the active pool 302. Thus, a redundant process or process set 212 may be modified, tested, expanded, and/or updated as required in the passive pool 304 and then switched with its corresponding process or process set 212 in the active pool 302 without requiring that the services supported by that process or process set 212 be taken off line for any more time than is required to make that switch. Switching, adding, modifying, testing, expanding, and updating processes or process sets 108 in that manner may be performed with the Container Editor Tool of the CMC service 218.

Figure 4:
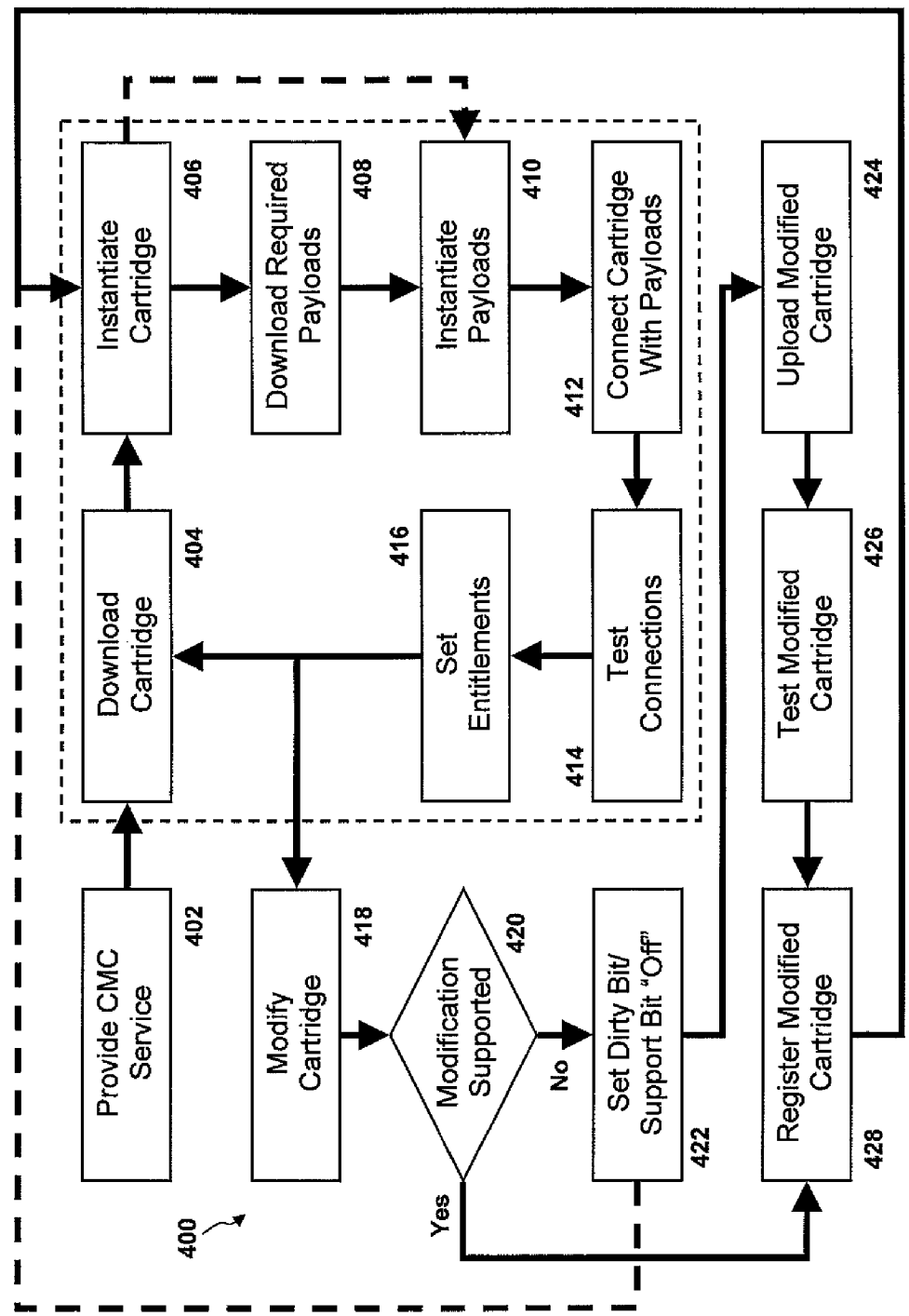
FIG. 4 is a flow diagram illustrating an example of a cloud IT service implementation process according to a non-limiting embodiment of the present disclosure.

Turning to FIG. 4, an example of a cloud IT service implementation process 400 is illustrated. At step 402, the vendor that offers IT management software and solutions via the solution provider system 102 provides a cloud IT service provider with a cloud IT service solution at the service provider system 104 maintained by that cloud IT service provider. That cloud IT service solution comprises the CMC service 218, which provides the cloud IT service provider with a catalog of the Cloud IT Service Containers 200 available for download from the solution provider system 102; an orchestration engine that supports the autonomic instantiation and implementation of downloaded Cloud IT Service Containers 200, as well as the download of the payloads 206 on which the downloaded Cloud IT Service Containers 200; a pool/grid controller that instantiates and provisions the downloaded payloads 206 in the payload pool/grid deployment 202; local container and payload libraries; a local registry of supported Cloud IT Service Containers 200, globally unique identifiers GUIDs, and container affiliations; and the Container Editor Tool.

As described above, the catalog, orchestration engine, Container Editor Tool, and pool/grid controller may be provided locally on the services servers 118 of the service provider system 104 and accessed with the service management GUI 126 via a LAN connection, or they may be provided remotely on the solution servers 108 of the solution provider system 102 and accessed with the service management GUI 126 via a WAN connection. As also described above, the local container library may be provided on the local container database 120; the local payload library may be provided on the local payload database 120; and the local registry of supported Cloud IT Service Containers 200, process GUIDs, and container affiliations may be provided on the local registry database 122. Those elements of the CMC service 218 provide the cloud IT service provider with the tools required to implement the cloud IT service solution.

At step 404, either the vendor or the cloud IT service provider downloads the Cloud IT Service Containers 200 that support the services that the cloud IT service provider will provide its customers with the cloud IT service solution. Those Cloud IT Service Containers 200 may be selected from the catalog and are downloaded to the local container database 120 of the service provider system 104 from the central container database 110 of the solution provider system 102. Generally, the vendor will download those Cloud IT Service Containers 200 as part of the solution initially delivered to the cloud IT service provider, and the cloud IT service provider will download any other Cloud IT Service Containers 200 that may subsequently be required to support any new or different services that the cloud IT service provider would like to provide its customers. In other words, after the vendor delivers the cloud IT service solution to the cloud IT service provider, the cloud IT service provider may utilize the CMC service in a self-service manner as required to meet its own changing needs and/or those of its customers.

When a Cloud IT Service Container 200 is downloaded, it is added to the local container library on the local container database 120. Further, if it is designated as a supported Cloud IT Service Container 200, it is registered in the local registry on the local registry database 124 together with the process GUIDs for any processes or process sets 212 provided in that Cloud IT Service Container 200. Downloading a Cloud IT Service Container 200 at step 404 initiates an autonomic process, which is performed at steps 406-416.

At step 406, the orchestration engine instantiates the downloaded Cloud IT Service Container 200 in the context of the particular solution by writing certain descriptors to the container specification 300 (e.g., Container GUID, Supported Solution Name(s), Cloud Service Description, etc.). At step 408, the orchestration engine reads and decomposes the container configuration automation scripts from the container specification 300 and invokes those scripts to automatically download any payload(s) 206 that may be required to implement that Cloud IT Service Container 200. At step 410, the pool/grid controller instantiates the downloaded payload(s) by provisioning them to the payload pool/grid deployment 202. And at step 412, the orchestration engine reads and decomposes payload configuration scripts from the container specification 300 and invokes those scripts to automatically configure, or pair, the Cloud IT Service Container 200 with the provisioned payload(s) 206.

As described above, the CMC service 126 may automatically connect to the solution provider system 102 and download the payload(s) 206 to the local payload database 122 of the service provider system from the central payload database 112 of the solution provider system 102. The Ca.xsd object schema in the container specification 300 contain the download instructions and the link information for any payload(s) 206 that may be required to implement a particular Cloud IT Service Container 200. And by provisioning payloads 206 to a dedicated and secure payload pool/grid deployment 202, the same payload(s) 206 may be linked to different Cloud IT Service Containers 200 if those different Cloud IT Service Containers 200 have similar dependencies.

When a payload 206 is downloaded, it is added to the local payload library on the local payload database 122. That payload 206 then may be utilized to support any Cloud IT Service Container 200 that may subsequently downloaded and that also depends on that payload 206. Accordingly, a payload 206 may be provisioned directly from the local payload database 122 when it already has been downloaded, rather than being downloaded from the central payload database 112 before it is provisioned to a particular Cloud IT Service Container 200. Thus, step 408 may be skipped if all of the payloads 206 required by a downloaded Cloud IT Service Container 200 already have been downloaded, as depicted by the dashed-line arrow in FIG. 4.

At step 414, the orchestration engine runs a test to confirm that the connections between the Cloud IT Service Containers 200 and the payloads 206 are properly functioning. More specifically, the orchestration engine runs a test to determine whether the processes or process sets 212 in each Cloud IT Service Container 200 are connected to the correct payloads 206 and performing as required to provide the services that should be supported by that Cloud IT Service Container 200. And at step 416, the orchestration engine automatically sets the entitlements for the Cloud IT Service Container 200 so as to allow the cloud IT service provider to fully configure the services that are supported by that Cloud IT Service Container 200. Step 416 completes the autonomic process initiated by downloading a Cloud IT Service Container 200 at step 404, which completes the implementation of a Cloud IT Service Container 200 in a cloud IT service solution. Accordingly, steps 404-416 may be repeated each time a Cloud IT Service Container 200 is downloaded until all of the Cloud IT Service Containers 200 required to support a solution have been downloaded, as depicted by the dashed-line box in FIG. 4.

As FIG. 4 also illustrates, an authorized user (e.g., the vendor or an administrator at the cloud IT service provider) may modify a downloaded Cloud IT Service Container 200 in a live environment, after it has been implemented, utilizing the Container Editor Tool. For example, a downloaded Cloud IT Service Container 200 may initially comprise one or more processes or process sets 212 in the active pool 302 that define the complete capabilities of the cloud IT service or integration supported by that Cloud IT Service Container 200. And the Cloud IT Service Container 200 may comprise zero or more processes or process sets 212 in the passive pool 304 that define additional or redundant cloud IT services or integrations that may optionally be delivered by that Cloud IT Service Container 200. Because that Cloud IT Service Container 200 was downloaded from the solution provider system 102 at step 404, that Cloud IT Service Container 200 and each of the processes or process sets 212 in each of its pools 302 and 304 will be registered as being supported by the CMC service 218 in the global container registry that is maintained in the central registry database 102. Accordingly, the Dirty Bit/Support Bit in the container specification 300 is set to a default value of "supported," or "on," which represents the starting state of the Cloud IT Service Container 200 when it is downloaded.

At step 418, an authorized user (e.g., the vendor or an administrator at the cloud IT service provider) may modify the Cloud IT Service Container 200 by switching, adding, and/or removing one or more processes or process sets 212 between the active pool 302 and the passive pool 304 by changing the state of those processes or process sets 212, thereby changing the capabilities of the cloud IT service or integration supported by the Cloud IT Service Container 200. In FIG. 3, for example, the authorized user may switch out the default first process or process set 212A for the alternative first process or process set 212A', such that the default first process or process set 212A is moved to the passive pool 304 (i.e., the state of the default first process or process set 212A is changed to "inactive") and the alternative first process or process set 212A' is moved to the active pool 302 (i.e., the state of the alternate first process or process set 212A' is changed to "active"). Or the authorized user may add the additional process or process set 212D into the active pool 302 (i.e., the state of the additional process or process set 212D is changed to "active") to provide an additional, different service. Such modifications may be performed in a live environment, without compromising the integrity of the Cloud IT Service Container 200.

Also at step 418, an authorized user may create and/or modify one or more processes or process sets 212, rather than switching processes or process sets 212 between pools 302 and 304 and/or adding processes or process sets 212 from the passive pool 304 to the active pool 302. To maintain the integrity of the Cloud IT Service Container 200 in the live environment, however, processes or process sets 212 may not be modified in the active pool 302. Thus, to modify a process or process set 212 that currently is in the active pool 302, the authorized user must first move that process or process set 212 to the passive pool 304 by changing the state of that process or process set 212 to "inactive." In the alternative, the authorized user may upload, or copy, a redundant instance of the same process or process set 212 to the passive pool 304 so that the corresponding process or process set 212 need not be removed from the active pool 302, thereby preventing the disruption of the service supported by that process or process set 212. Accordingly, such modifications also may be performed in a live environment, without compromising the integrity of the Cloud IT Service Container 200.

The authorized user may create and/or modify one or more processes or process sets 212 with the Container Editor Tool, which supports operations for copying, modifying, or creating new processes or process sets 212 in the passive pool 304. Accordingly, the authorized user may modify an existing, registered process or process set 212 or create a new, unregistered process or process set 212 from scratch when a registered Cloud IT Service Container 200 and/or process or process set 212 that suits the cloud IT service provider's needs is not available for download from the solution provider system 102. In response to the creation and/or modification of a process or process set 212, the Container Editor Tool writes a new, unregistered process GUID to the container specification 300 for the new and/or modified process or process set 212. That unregistered GUID is stored in the local registry maintained in the local registry database 124.

In response to any type of modification (e.g., switching, adding, removing, modifying, or creating processes or process sets 212), the Container Editor Tool also generates a log of those modifications and writes it to the container specification 300, together with the current state of the Cloud IT Service Container 200. That modification log may be queried by the CMC service 218 to identify specific modifications to a Cloud IT Service Container 200 and when they were made. Such a log may be utilized by the vendor when determining whether a modification is approved for operation in the CMC service 218.

At step 420, the CMC service 218 determines if the modification performed at step 418 is supported. If registered processes or process sets 212 were switched, added, and/or removed to/from to the active pool 302 at step 418, the modification is determined to be supported at step 420 (i.e., Step 420=Yes). But if processes or process sets 212 were created and/or modified at step 418, those processes or process sets 212 will be unregistered and the modification is determined to be unsupported at step 420 (i.e., Step 420=No). Thus, the Container Editor Tool toggles the Dirty Bit/Support Bit in the container specification 300 to "unsupported," or "off," at step 422 when a process or process set 212 is modified and/or created at step 418, while switching, adding, and/or removing registered processes or process sets 212 to/from the active pool 308 at step 418 does not effect the Dirty Bit/Support Bit, which remains set to the default value of "supported," or "on," after such a modification.

Toggling the Dirty Bit/Support Bit to "unsupported," or "off," at step 422 represents that the subject process or process set 212 has not been approved for operation with the CMC service 218. Nevertheless, the authorized user may add that modified process or process set 212 to the active pool 418 at step 418. The addition of such an unsupported process or process set 212 to the active pool 302, however, may compromise the integrity of the Cloud IT Service Container 200. Accordingly, the authorized user also may leave the modified process or process set 212 in the passive pool 304 and upload an instance of the modified Cloud IT Service Container 200 to the solution provider system 102 at step 424 for testing, certification, and support approval.

At step 426, new or modified process or process set 212 is moved to the active pool 302 by changing its state to "active" in the uploaded instance of the Cloud IT Service Container 200, and it is tested for problems. After any problems are identified and resolved, the new or modified process or process set 212 may be certified for use with the Cloud IT Service Container 200 and approved for operation with the CMC service 218. That process or process set 212, as well as its Cloud IT Service Container 200, then are registered in the global registry at step 428. Such registered processes or process sets 212 and Cloud IT Service Containers 200 are identified in the global registry with unique GUIDs. Then, after the modified process or process set 212 is registered at step 428, the authorized user may switch and/or add that registered process or process set 212 to the active pool 302 of the live instance of the corresponding Cloud IT Service Container 200 without compromising the integrity of that Cloud IT Service Container 200, and without interrupting the services that are supported by the live instance of that Cloud IT Service Container 200.

Even though switching and/or adding registered processes or process sets 212 to the active pool 302 does not effect the Dirty Bit/Support Bit in the container specification 300, such a modification changes the content of the Cloud IT Service Container 200. Accordingly, the modified Cloud IT Service Container 200 may be registered with the solution provider system 102 at step 428 even when a modification is determined to be supported at step 420. Such modified Cloud IT Service Containers 200 may be registered both in the local registry maintained in the local registry database 124 and the global registry maintained in the central registry database 114 so that the solution provider system 102 may track such modifications, which allows the vendor to update their default processes or process sets 212 in response to the modifications being made in the field. The registration of Cloud IT Service Containers 200 with new or modified processes or process sets 212 at step 428 supports similar tracking.

Although each of the foregoing modifications may be performed in a live environment by modifying processes or process sets 212 that are in the passive pool 304 of a Cloud IT Service Container 200, they also may be performed off-line on Cloud IT Service Containers 200 that have been downloaded to the local container database 120 of a service provider system 104. Accordingly, steps 418-428 may be performed in a similar manner as described above, but followed by steps 406-416 so that the modified Cloud IT Service Container 200 may be implemented after it is modified. And just as an authorized user may switch an unregistered, modified process or process set 212 to the active pool 302 of a Cloud IT Service Container 200 at step 418, the authorized user also may implement a Cloud IT Service Container 200 that has its Dirty Bit/Support Bit toggled to "unsupported," or "off," at step 422, as depicted by the dashed line arrow between step 422 and step 406 in FIG. 4. As described above, however, implementing such unregistered Cloud IT Service Containers 200 may compromise the integrity of the services that are supported by such Cloud IT Service Containers 200.

Being able to switch, add, remove, modify, and/or create processes or process sets 212 enables cloud IT service providers to flexibly change the capabilities of a Cloud IT Service Container 200 in a self-service manner. And being able to perform such modifications on processes or process sets 212 in a passive pool 304 enables cloud IT perform those modifications in a live environment without compromising the integrity of the Cloud IT Service Container 200 or the service supported by that Cloud IT Service Container 200. Moreover, registering those modifications with the solution provider system 102 supports the development and proliferation of enhancements of to cloud IT services provided by such Cloud IT Service Containers 200. In addition, by encompassing multiple switchable, registered processes or process sets 212 in a single Cloud IT Service Container 200, a cloud IT service provider may modify a cloud IT service being delivered by a Cloud IT Service Container 200 on the fly without having to re-test all the services that may be effected by the change, thus saving time, avoiding costly delays, costs and custom implementations.

To provide additional flexibility, different container operations may be created and/or modified for a particular Cloud IT Service Container 200 in a similar manner to that described above with respect to modifying and/or creating processes or process sets 212 (e.g., Step 418). Moreover, those new and/or modified operations may be uploaded, tested, and registered with the solution provider system 102 in a similar to that describe above with respect to processes or process sets 212 (e.g., Steps 420-424). Registering new and/or modified container operations in that manner further prevents compromising the integrity of a Cloud IT Service Container 200 while, at the same time, enabling flexibility of design.

The CMC service 218 provides the foundational framework for advanced, granular management and control of the Cloud IT Service Containers 200 and their corresponding processes or process sets 212, thereby enabling higher level operations at a container level, such as listing services, setting entitlements, tracking consumer activity across a service, downloading/uploading containers, metering usage, etc. Further, the CMC service 218 provides cloud IT providers with access to a large number or types of services that be delivered via a reference model based on automatically instantiated Cloud IT Service Containers 200 and payloads 206. Such Cloud IT Service Containers 200 and payloads 206 may be developed for any type of cloud IT services and, therefore, disclosed embodiments are restricted to any particular service, vendor, or product The schematic and flow diagrams in FIGS. 1-4 illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A system comprising:
    a processor that is configured to execute computer-readable program code to download and implement one or more containers; and
    one or more particular containers downloaded by the system that comprise computer-readable program code configured to provide at least one service, as downloaded, wherein the computer-readable program code of the one or more particular containers downloaded by the system comprises:
    one or more processes that are configured to provide the at least one service;
    one or more adapters that are configured to connect the one or more processes to one or more appliances, applications, and other services that are required to provide the at least one service;
    a container specification that identifies the one or more appliances, applications, and other services that are required to provide the at least one service; and
    one or more configuration scripts that, when executed by the processor, are configured to connect the one or more processes to the one or more appliances, application, and other services identified by the container specification utilizing the one or more adapters.

2. The apparatus of claim 1, wherein:
    each of the one or more particular containers comprises a plurality of processes that are configured to provide the at least one service;

at least one first process from among the plurality of processes is in an active state, the active state being one in which the at least one first process provides the at least one service; and at least one second process from among the plurality of processes is in a passive state, the passive state being one in which the at least one second process does not provide the at least one service.

3. The apparatus of claim 2, wherein the processor is further configured to execute computer-readable program code to modify the one or more particular containers by at least one of:

changing the state of the at least one first process from the active state to the passive state so that the at least one first process does not provide the at least one IT service;

changing the state of the at least one second process from the passive state to the active state so that the at least one second process provides the at least one IT service; and loading a third process to the one or more particular containers, the third process not being from among the plurality of containers.

4. The apparatus of claim 1, wherein:

each of the one or more particular containers comprises a plurality of processes that are configured to provide the at least one service for consumption by a plurality of tenants;

each of the plurality of processes may be accessed by the plurality of tenants based on one or more user entitlements; and the processor is further configured to execute computer-readable program code to cause at least one first process from among the plurality of process to overload at least one second process from among the plurality of processes by modifying the one or more user entitlements of the at least one second process, such that:

at least one first tenant from among the plurality of tenants may access the at least one first process in response to a request for the at least one service, and at least one second tenant from among the plurality of tenants is redirected to the at least one second process in response to a request for the at least one service.

5. The apparatus of claim 1, wherein:

the one or more processes are configured to be performed by directing requests for the at least one service through one of a plurality of routes;

each of the plurality of routes corresponds to a quality of service level;

each quality of service level corresponds to run time information comprising at least one of a user ID, a group ID, a tenant ID, and a target resource ID;

the target resource ID corresponds to the one or more appliances, applications, and other services that are required to provide the at least one service; and the processor is further configured to execute computer-readable program code to cause the requests for the at least one service to be directed through:

a first of the plurality of routes when the request comprises run time information that corresponds to a first quality of service level, and a second of the plurality of routes when the request comprises run time information that corresponds to a second quality of service level.

6. The apparatus of claim 1, wherein:

each of the one or more processes comprises one or more process elements that make up at least a portion of that process;

at least one of the one or more processes, the one or more process elements, and the one or more appliances, applications, and other services that are required to provide the at least one service is associated with a usage model that defines one or more costs that are incurred when one or more of the at least one process is used, the at least one process element is used, and the at least one appliance, application, or other service is used; and the processor is further configured to execute computer-readable program code to log the one or more costs associated with the usage of the one or more of the at least one process, the at least one process element, and the at least one appliance, application, or other service.

7. The apparatus of claim 1, wherein:

the apparatus further comprises one or more standardized service interface templates that are configured to generate a standardized user interface for consuming the at least one service provided by the one or more particular containers;

the one or more particular containers comprise a plurality of different processes that are configured to provide the at least one service; and the standardized user interface comprises functionality for performing user-facing interactions that remain the same for a plurality of different processes.

8. The apparatus of claim 1, wherein:

the one or more particular containers are configured to determine a state of the one or more processes when the one or more processes are providing the at least one service; and the state of the one or more processes corresponds to a portion of the one or more processes that has been completed when the state is determined.

9. A method for downloading and implementing one or more containers that comprise computer-readable program code configured to provide at least one service, wherein downloading and implementing the one or more containers comprises:

downloading each of the one or more containers, the downloaded computer-readable program code of the one or more containers comprising one or more processes, one or more adapters, a container specification that identifies one or more appliances, applications, and other services, and one or more configuration scripts when downloaded;

connecting the one or more processes to one or more appliances, applications, and other services that are identified by the container specification;

executing the configuration scripts to connect the one or more processes to the one or more appliances, application, and other services identified by the container specification utilizing the one or more adapters; and performing the one or more processes to provide the at least one service utilizing the one or more appliances, application, and other services connected to the one or more processes via the one or more adapters.

10. The method of claim 9, wherein:

each of the one or more containers comprises a plurality of processes that are configured to provide the at least one service;

the method further comprises:

placing at least one first process from among the plurality of processes in an active state , the active state being one in which the at least one first process provides the at least one service; and placing at least one second process from among the plurality of processes in a passive state, the passive state being one in which the at least one second process does not provide the at least one service.

11. The method of claim 10, further comprising modifying the one or more containers by at least one of:
changing the state of the at least one first process from the active state to the passive state so that the at least one first process does not provide the at least one IT service;
changing the state of the at least one second process from the passive state to the active state so that the at least one second process provides the at least one IT service; and
loading a third process to the one or more containers, the third process not being from among the plurality of containers.

12. The method of claim 9, wherein:
each of the one or more containers comprises a plurality of processes that are configured to provide the at least one service for consumption by a plurality of tenants;
each of the plurality of processes may be accessed by the plurality of tenants based on one or more user entitlements; and
the method further comprises causing at least one first process from among the plurality of process to overload at least one second process from among the plurality of processes by modifying the one or more user entitlements of the at least one second process, such that:
at least one first tenant from among the plurality of tenants may access the at least one first process in response to a request for the at least one service, and
at least one second tenant from among the plurality of tenants is redirected to the at least one second process in response to a request for the at least one service.

13. The method of claim 9, wherein:
the one or more processes are performed by directing requests for the at least one service through one of a plurality of routes;
each of the plurality of routes corresponds to a quality of service level;
each quality of service level corresponds to run time information comprising at least one of a user ID, a group ID, a tenant ID, and a target resource ID;
the target resource ID corresponds to the one or more appliances, applications, and other services that are required to provide the at least one service; and
the method further comprises causing the requests for the at least one service to be directed through:
a first of the plurality of routes when the request comprises run time information that corresponds to a first quality of service level, and
a second of the plurality of routes when the request comprises run time information that corresponds to a second quality of service level.

14. The method of claim 9, wherein:
each of the one or more processes comprises one or more process elements that make up at least a portion of that process;
at least one of the one or more processes, the one or more process elements, and the one or more appliances, applications, and other services that are required to provide the at least one service is associated with a usage model that defines one or more costs that are incurred when one or more of the at least one process is used, the at least one process element is used, and the at least one appliance, application, or other service is used; and
the method further comprises logging the one or more costs associated with the usage of the one or more of the at least one process, the at least one process element, and the at least one appliance, application, or other service.

15. The method of claim 9, wherein:
the one or more containers comprise a plurality of different processes that are configured to provide the at least one service; and
the method further comprises:
generating a standardized user interface for consuming the at least one service provided by the one or more containers utilizing one or more standardized service interface templates, and
performing the same user-facing interactions for a plurality of different processes via the standardized user interface.

16. The method of claim 9, further comprising determining a state of the one or more processes when the one or more processes are providing the at least one service, wherein the state of the one or more processes corresponds to a portion of the one or more processes that has been completed when the state is determined.

17. A computer program product comprising non-transitory computer-readable program code that is configured to provide at least one service, wherein the computer-readable program code comprises:
one or more downloaded containers, the downloaded computer-readable program code of the one or more containers comprising:
one or more processes that are configured to provide the at least one service;
one or more adapters that are configured to connect the one or more processes to one or more appliances, applications, and other services that are required to provide the at least one service;
a container specification that identifies the one or more appliances, applications, and other services that are required to provide the at least one service; and
one or more configuration scripts that are configured to connect the one or more processes to the one or more appliances, application, and other services identified by the container specification utilizing the one or more adapters.

18. The computer program product of claim 17, wherein:
each of the one or more containers comprises a plurality of processes that are configured to provide the at least one service;
the computer program product further comprises:
computer-readable program code configured to place at least one first process from among the plurality of processes in an active state , the active state being one in which the at least one first process provides the at least one service; and
computer-readable program code configured to place at least one second process from among the plurality of processes in a passive state, the passive state being one in which the at least one second process does not provide the at least one service.

19. The computer program product of claim 18, further comprising computer-readable program code configured to place modify the one or more containers by at least one of:
changing the state of the at least one first process from the active state to the passive state so that the at least one first process does not provide the at least one IT service;
changing the state of the at least one second process from the passive state to the active state so that the at least one second process provides the at least one IT service; and
loading a third process to the one or more containers, the third process not being from among the plurality of containers.

20. The computer program product of claim 19, wherein:

each of the one or more containers comprises a plurality of processes that are configured to provide the at least one service for consumption by a plurality of tenants;

each of the plurality of processes may be accessed by the plurality of tenants based on one or more user entitlements; and the computer program product further comprises computer-readable program code configured to cause at least one first process from among the plurality of process to overload at least one second process from among the plurality of processes by modifying the one or more user entitlements of the at least one second process, such that:

at least one first tenant from among the plurality of tenants may access the at least one first process in response to a request for the at least one service, and at least one second tenant from among the plurality of tenants is redirected to the at least one second process in response to a request for the at least one service.

21. The computer program product of claim 17, wherein:

the computer-readable program code configured to perform the one or more processes by directing requests for the at least one service through one of a plurality of routes;

each of the plurality of routes corresponds to a quality of service level;

each quality of service level corresponds to run time information comprising at least one of a user ID, a group ID, a tenant ID, and a target resource ID;

the target resource ID corresponds to the one or more appliances, applications, and other services that are required to provide the at least one service; and the computer program product further comprises computer-readable program code configured to cause the requests for the at least one service to be directed through:

a first of the plurality of routes when the request comprises run time information that corresponds to a first quality of service level, and a second of the plurality of routes when the request comprises run time information that corresponds to a second quality of service level.

22. The computer program product of claim 17, wherein:

each of the one or more processes comprises one or more process elements that make up at least a portion of that process;

at least one of the one or more processes, the one or more process elements, and the one or more appliances, applications, and other services that are required to provide the at least one service is associated with a usage model that defines one or more costs that are incurred when one or more of the at least one process is used, the at least one process element is used, and the at least one appliance, application, or other service is used; and the computer program product further comprises computer-readable program code configured to log the one or more costs associated with the usage of the one or more of the at least one process, the at least one process element, and the at least one appliance, application, or other service.

23. The computer program product of claim 17, wherein:

the one or more containers comprise a plurality of different processes that are configured to provide the at least one service; and the computer program product further comprises computer-readable program code configured to:

generate a standardized user interface for consuming the at least one service provided by the one or more containers utilizing one or more standardized service interface templates, and perform the same user-facing interactions for a plurality of different processes via the standardized user interface.

24. The computer program product of claim 17, further comprising computer-readable program code configured to determine a state of the one or more processes when the one or more processes are providing the at least one service, wherein the state of the one or more processes corresponds to a portion of the one or more processes that has been completed when the state is determined.

* * * * *